D. M. BARR.
INHALER.
APPLICATION FILED FEB. 25, 1915.
1,151,649.
Patented Aug. 31, 1915.
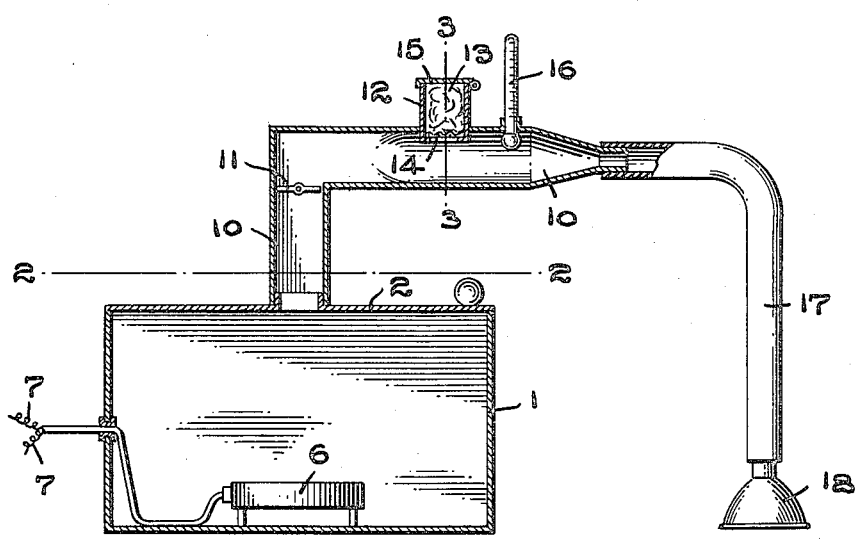
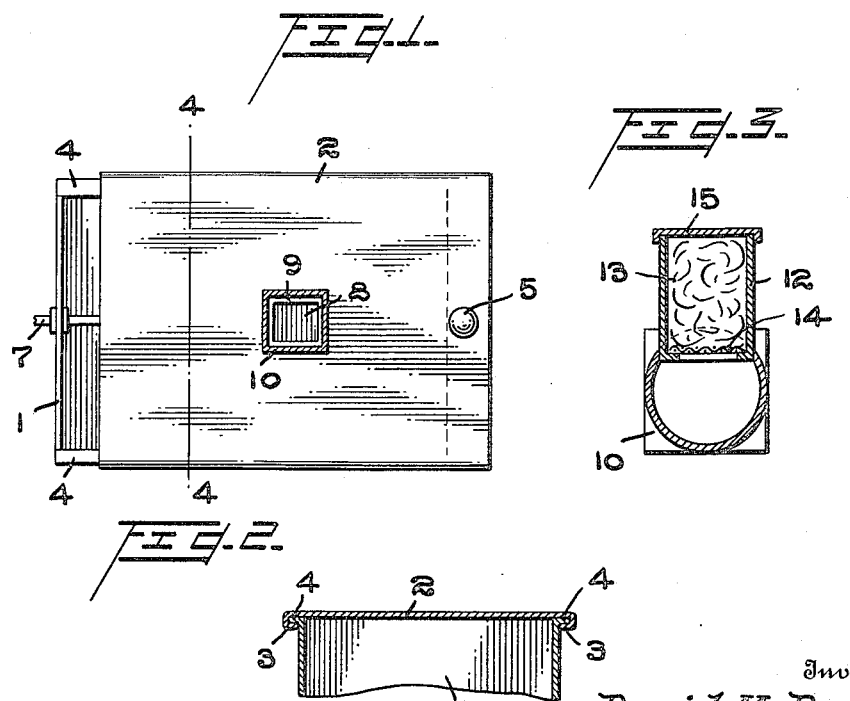
Witnesses
Inventor
David M. Barr,
By Joshua R. H. Potts.
His Attorney

UNITED STATES PATENT OFFICE.

DAVID MILLER BARR, OF PHILADELPHIA, PENNSYLVANIA.

INHALER.

1,151,649.  Specification of Letters Patent.  Patented Aug. 31, 1915.

Application filed February 25, 1915.  Serial No. 10,473.

*To all whom it may concern:*

Be it known that I, DAVID MILLER BARR, a citizen of the United States, residing at Philadelphia, in the county of Philadelphia and State of Pennsylvania, have invented certain new and useful Improvements in Inhalers, of which the following is a specification.

My invention relates to improvements in inhalers, and more particularly to a combined sterilizer, an esthetizer, and medicator, the object of the invention being to provide a device of the character stated which will supply air at the desired temperature, medicated, sterilized, or otherwise treated in accordance with the needs of the patient.

A further object is to provide a device of the character stated which is designed for treating all disorders of the nose, throat, and lungs, supplying the necessary ingredient or element to give tone and strength to vocal cords to medicate in cases of catarrh, asthma, hay fever, bronchitis, and the like, to arrest pneumonia in its early stage, and for various other uses in the treatment of the affected parts which can be reached by inhalation.

A further object is to provide a device of the character stated which can be taken apart and housed within the heat casing, which latter constitutes a box or receptacle for the purpose.

With these and other objects in view, the invention consists in certain novel features of construction and combinations and arrangements of parts as will be more fully hereinafter described and pointed out in the claims.

In the accompanying drawings, Figure 1 is a view partly in longitudinal section and partly in elevation illustrating my improvements. Fig. 2 is a view in horizontal section on the line 2—2 of Fig. 1. Fig. 3 is a view in vertical transverse section on an enlarged scale on the line 3—3 of Fig. 1, and Fig. 4 is a fragmentary view in section on the line 4—4 of Fig. 2.

1 represents a casing having a sliding cover 2 thereon. This cover 2 is provided with inwardly turned flanges 3 at its side edges engaging over outwardly projecting flanges 4 on the casing so as to effectually guide the cover and permit it to slide to any open position desired, and to facilitate this movement of the cover, I provide a knob 5 thereon.

In the casing 1, an electric heater 6 is located having supply wires 7 connected thereto in any approved manner. The cover 2 is provided centrally with an angular opening 8 having an angular collar 9 around the same to receive and couple with an angular pipe 10 which is in the form of an elbow, and which is provided with a damper 11 to regulate the flow of air therethrough.

The horizontal portion of the pipe 10 is provided with a receptacle 12 adapted to contain medicated absorbent 13 or other improved material to impregnate the air.

The bottom of receptacle 12 is open, and provided with a screen 14, while the top of the receptacle is normally closed by a hinged cover 15. A thermometer 16 is located in the pipe 10, which indicates at a glance the temperature of the air passing therethrough, and the free end of the pipe 10 is reduced so as to readily couple with a hose 17 of any desired length, having a mouth piece 18 at its free end.

While I have referred to the heater 6 as an electric heater, it is of course to be understood that the casing 1 may be heated in various ways so as to heat and dry the air in the casing before it enters pipe 10.

To admit the necessary amount of air to the casing in accordance with the supply desired, the cover 2 is slid back on the casing as shown in Fig. 2, and in accordance with the size of the opening thus provided in the end of the casing, the quantity of cold air admitted is regulated.

The damper 11 controls the supply of air, which passes through the pipe 10 and as this air moves in contact with the screen 14, it is impregnated with the contents of the receptacle 12.

As above stated, this receptacle may contain any suitable material, so that the device will constitute a sterilizer, an esthetizer, or medicator, and afford a ready means for treating the patient through the medium of air or gas. I would therefore have it understood that I do not limit myself to any particular use of this apparatus, as it is capable of a wide range of usefulness in the treatment of the nose, mouth, throat and lungs.

When the device is not in use, pipe 10 can be uncoupled from the collar 9, hose 17 can be disconnected from the pipe 10, and all of the parts can be placed in the casing 1, so that when the cover 2 is moved into closed position, the casing will constitute a box or receptacle to house all of the parts of the device.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A device of the character stated, comprising a casing in which air is adapted to be heated, a sliding cover on the casing, said cover adapted to be moved to regulate the inlet of air to the casing, said cover having an outlet opening and a collar around the opening, a pipe coupled to the collar, and a receptacle communicating with the pipe and adapted to contain material to impregnate the air passing through the pipe, substantially as described.

2. A device of the character stated, comprising a casing in which air is adapted to be heated, a sliding cover on the casing, said cover adapted to be moved to regulate the inlet of air to the casing, said cover having an outlet opening and a collar around the opening, a pipe coupled to the collar, a receptacle communicating with the pipe and adapted to contain material to impregnate the air passing through the pipe, and a damper in said pipe controlling the flow of air therethrough, substantially as described.

3. A device of the character stated, comprising a casing in which air is adapted to be heated, a sliding cover on the casing, said cover adapted to be moved to regulate the inlet of air to the casing, said cover having an outlet opening and a collar around the opening, a pipe coupled to the collar, a receptacle communicating with the pipe and adapted to contain material to impregnate the air passing through the pipe, and a thermometer projecting into the pipe, substantially as described.

4. A device of the character stated, comprising a casing in which air is adapted to be heated, a sliding cover on the casing, said cover adapted to be moved to regulate the inlet of air to the casing, an outlet pipe communicating with the casing, a receptacle communicating with an opening in the pipe and having a screen at its lower end, said receptacle adapted to contain material to impregnate the air passing through the pipe, and a hinged cover on said receptacle, substantially as described.

5. A device of the character described, comprising a casing having a sliding cover, an electric heater in the casing, an outlet tube communicating with an opening in the cover and removably connected to the cover, said tube having means thereon for impregnating the air passing therethrough and constructed at one end for the attachment of a hose, and a damper in said pipe, said receptacle of a size to receive all of the above described parts of the device and inclose the same when not in use, substantially as described.

In testimony whereof I have signed my name to this specification in the presence of two subscribing witnesses.

DAVID MILLER BARR.

Witnesses:
C. R. ZIEGLER,
S. W. FOSTER.

Copies of this patent may be obtained for five cents each, by addressing the "Commissioner of Patents, Washington, D. C."